United States Patent

[11] 3,581,697

| | | | |
|---|---|---|---|
| [72] | Inventor | Fred C. Gunther | |
| | | 3455 Linda Vista Road, Glendale, Calif. | |
| | | 91206 | |
| [21] | Appl. No. | 798,954 | |
| [22] | Filed | Feb. 13, 1969 | |
| [45] | Patented | June 1, 1971 | |

[54] SEAL STRUCTURE FOR RIGID SIDEWALL HOVERCRAFT
9 Claims, 7 Drawing Figs.

[52] U.S. Cl. .................................................. 114/67, 180/116
[51] Int. Cl. ...................................................... B63b 1/38
[50] Field of Search............................................ 114/67.1

[56] References Cited
UNITED STATES PATENTS

| | | | | |
|---|---|---|---|---|
| 3,027,860 | 4/1962 | Priest ............................ | 114/67 |
| 3,198,274 | 8/1965 | Cocksedge ..................... | 114/67 |
| 3,473,503 | 10/1969 | Gunther ........................ | 114/67 |
| 3,478,836 | 11/1969 | Eckered et al. ................ | 114/67 |
| 3,481,296 | 12/1969 | Stephens ....................... | 114/67 |

*Primary Examiner*—Andrew H. Farrell
*Attorney*—Lyon and Lyon

ABSTRACT: A seal structure for a hovercraft having spaced rigid sidewalls joined by a deck in which conjoined minor and major inflatable cylinders extend between the sidewalls of the hovercraft, the minor cylinder being transversely distortable and hinged as well as sealed to the stern or bow margins of the deck and the ends of the cylinders being in substantially sealing and sliding engagement with the sidewalls; the underside of the major cylinder being intended for water contact and having ribs arranged to permit controlled escape of air to minimize frictional contact.

INVENTOR.
FRED C. GUNTHER

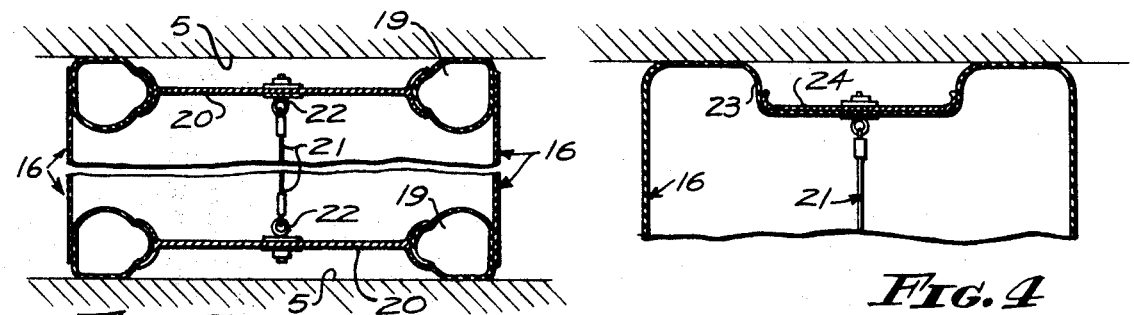
FIG. 3
FIG. 4
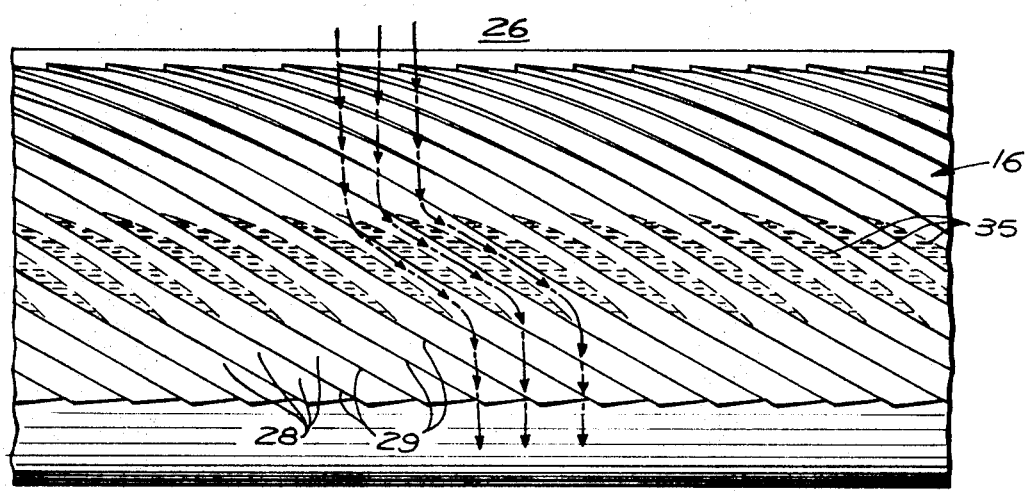
FIG. 5
DIRECTION OF VEHICLE TRAVEL
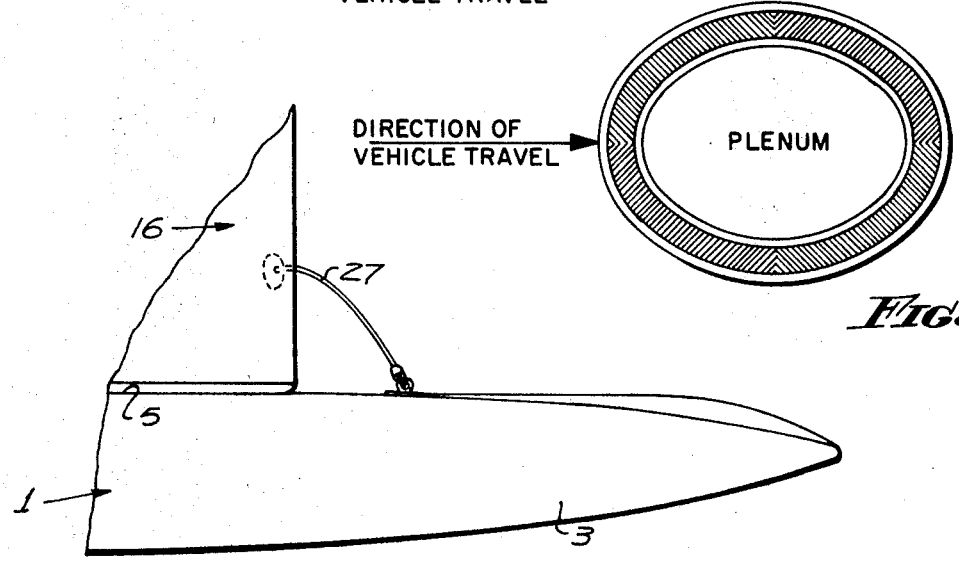
FIG. 6
DIRECTION OF VEHICLE TRAVEL
PLENUM
FIG. 7
INVENTOR.
FRED C. GUNTHER
BY Lyon & Lyon
ATTORNEYS

SEAL STRUCTURE FOR RIGID SIDEWALL HOVERCRAFT

BACKGROUND OF THE INVENTION

Rigid sidewall hovercraft has evolved as a marine specialization of the peripheral skirt hovercraft in which a flexible skirt encircles the entire craft, and air is supplied to a plenum formed within the peripheral skirt and is intended to leak around the entire skirt circumference while sustaining this type of hovercraft above water, or underlying surface. The sidewalls of the rigid sidewall hovercraft are intended to remain immersed in water while air is intended to escape only fore and aft under flexible seals extending between the sidewalls. While the immersed rigid sidewalls of this arrangement introduce a wetted drag, this is more than compensated by substantial reduction in lift power at cruise speed because leakage under the sidewalls is avoided. In fact, the lift power may be reduced from 40 percent of the total power, in the case of peripheral skirt hovercraft, to 10 percent, in the case of rigid sidewall hovercraft, providing that careful end sealing of the plenum air is maintained.

SUMMARY OF THE INVENTION

To accomplish this advantage requires minimal forward and rearward air leakage for the rigid sidewall hovercraft. The present invention is directed to a seal structure which is especially applicable for use at the stern of the rigid sidewall hovercraft, principally because the problem of air leakage control at the stern is more difficult than at the bow; however, the seal structure may be used advantageously at the bow of the hovercraft. More particularly, the present invention is applicable to the buoyant hull hovercraft disclosed in my copending application, Ser. No. 703,752, filed Feb. 7, 1968. The present invention is summarized in the following objects:

First, to provide a seal structure for rigid sidewall hovercraft wherein a minor diameter and major diameter inflatable parallel axis cylinders are joined longitudinally to each other, the smaller being hinged as well as sealed to the forward or rearward margin of a deck extending between the side hulls, and the ends of the cylinders being in sealing or semisealing engagement with the confronting sides of the hulls and capable of relatively free sliding movement; the underside of the larger cylinder being forced by inflation pressure into contact with the water.

Second, to provide a seal structure as indicated in the preceding object wherein the minor cylinder is readily distortable in response to wave action permitting the major cylinder to raise and lower readily in conformity to changing elevation of the water as waves pass from bow to stern.

Third, to provide a seal structure for hovercraft as indicated in the preceding objects which incorporates a novel seal means at the ends of the larger inflatable cylinder for engagement with the sidewalls of the hovercraft, the seal providing minimum resistance to sliding movement relative to the hull surfaces as the larger cylinder moves in conformance with the change in the surface of the water passing between the hulls.

Fourth, to provide a seal structure for hovercraft which has particularly low weight and inertia so that only a moderate elastic downforce resulting from distortion of the inflated minor cylinder need be applied to the major cylinder in order to maintain the major cylinder in effective contact with the underlying water even though the water level varies substantially and at a rapid rate as successive waves pass from bow to stern when the hovercraft is traveling at high speed.

Fifth, to provide a seal structure for hovercraft wherein the cross sections of the major and minor cylinders are determined by inflation pressure and the external mechanical forces applied thereto; that is, the cylinders are free of internal cords or other tension elements in order to maintain the external shape with the result that manufacturing costs are materially reduced and undesirable "quilting" of the surface is avoided.

Sixth, to provide a seal structure for hovercraft in which the water contacting portions are provided with novelly arranged planing steps permitting controlled escape of plenum air in such a manner that water contact drag is minimized and causing the seal to slide on the water in a highly stable condition.

Seventh, to provide a seal structure of the type indicated which is locally as well as generally yieldable to water impact minimizing the transfer of such impact to the structural parts of the hovercraft and to the seal structure.

DESCRIPTION OF THE FIGURES

FIG. 3 is a fragmentary sectional view, taken through 3-3 of FIG. 2, showing one form of end seal.

FIg. 4 is a similar fragmentary sectional view, showing a modified form of end seal.

FIG. 5 is a fragmentary bottom view of the major or buoyant inflatable cylinder to illustrate particularly that portion of which contacts the underlying water.

FIG. 6 is a fragmentary plan view showing a portion of the bow of a hovercraft, and illustrating the seal structure in relation thereto.

FIG. 7 is a diagrammatical bottom view of the toroidal inflated buoyant cell of a softwall or peripherally skirted hovercraft under which planing surfaces are provided.

Figure 1:
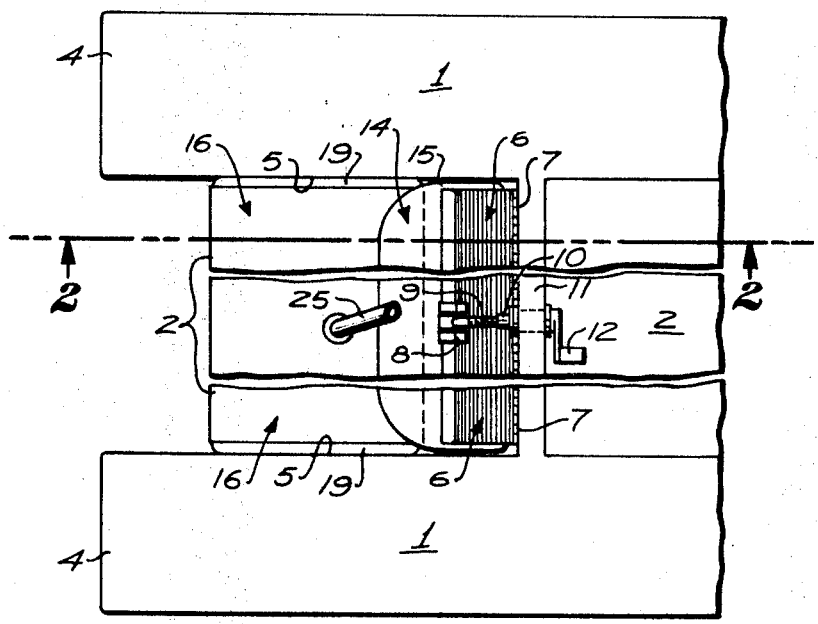
FIG. 1 is a fragmentary plan view showing the stern portion of the hovercraft, and the seal structure mounted between the hulls of the hovercraft.

The sealing structure is particularly adapted for use with a hovercraft comprising a pair of hulls 1, connected by a deck 2. The construction thereof may be similar to the aforementioned copending application, and thus may be buoyant; that is, the hulls have sufficient displacement as to support the hovercraft when the hovercraft is idle in the water. The bows 3 of the hulls project forwardly of the deck, whereas the stern portions 4 project rearwardly of the deck. In the region forwardly and rearwardly of the deck, the hulls include confronting walls 5 which are essentially parallel to each other.

Figure 2:
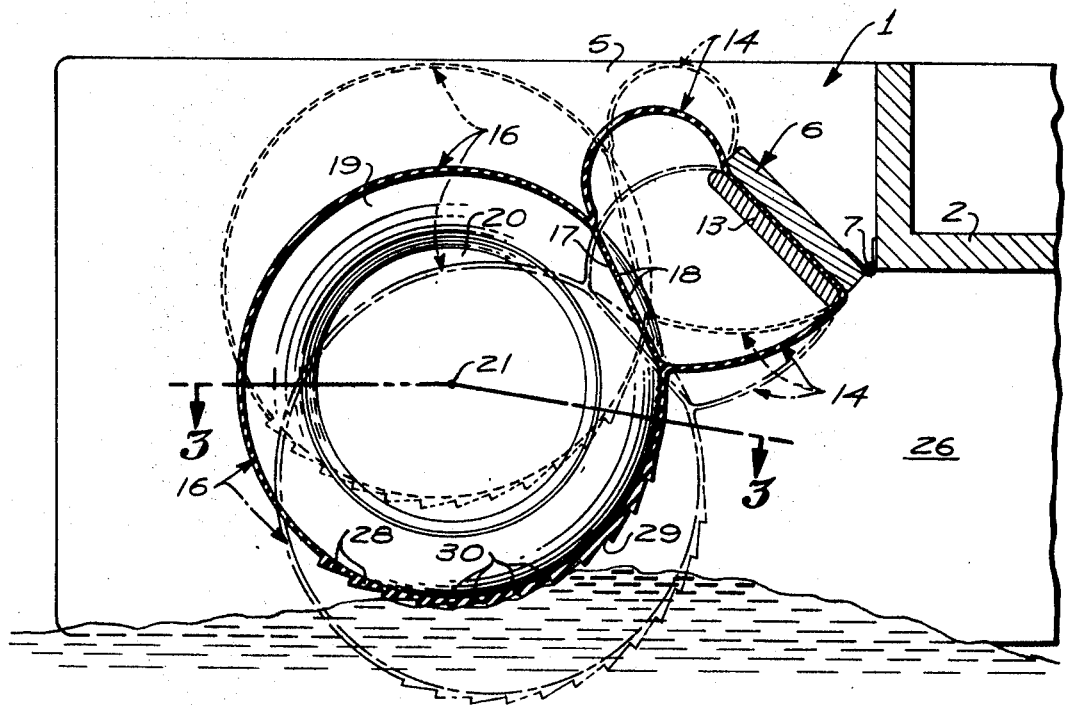
FIG. 2 is an enlarged fragmentary sectional view, taken through 2-2 of FIG. 1, with the seal structure shown by solid lines in the mid position, and indicating by broken and dotted lines, typical lower and upper positions of the seal structure.

Reference is first directed particularly to FIGS. 1 and 2 which show the seal structure as applied to the stern of a hovercraft. Extending between the confronting walls 5 is a hinge plate 6, connected by a hinge 7 to the stern margin of the deck 2. The hinge plate extends angularly upwardly and rearwardly from the hinge 7 and is intended to be angularly adjusted. For convenience of illustration, a hand operated adjustment means is illustrated, whereas in practice, an electric or hydraulic adjustment means suitable for remote control is utilized. More particularly, as illustrated, a fitting 8 is secured to the hinge plate 6 and pivotally supports one end of a screwshaft 9, which is received in a screw sleeve 10 journaled in the rear wall 11 of the deck 2 and capable of rotation by a hand crank 12.

Clamped to the hinge plate 6 by an internal clamp plate 13 is a minor inflatable cylinder or flexure cylinder 14 extending between the confronting walls 5. The cylinder 14 includes closed ends 15 which may contact the confronting walls 5 or are closely adjacent thereto to minimize the leakage of air around the ends of the cylinder 14.

The side of the flexure cylinder 14, opposite from the clamp plate 13, is joined to a major inflatable cylinder or buoyant cylinder 16 so that the two cylinders share a partition web 17, having perforations 18.

The ends of the major or buoyant cylinder 16 are joined to end seals 19 in the form of toroidal tubes which may be similar to the inner tubes of vehicle wheels. The tubes are intended to be pressurized independently of the buoyant cylinder and may be provided with conventional tire valves for this purpose. Each end seal 19 is mounted on the periphery of a closure disc 20. The two closure discs 20 are joined together by a restraining or tension cable 21 and suitable anchor fittings 22.

Alternatively, the major or buoyant cylinder 16 may have end closures 23, in each of which is mounted a central disc 24 joined in the manner of the discs 20 by a restraining cable 21. The central discs 24 are held away from the walls 5 by the restraining cable; however, the peripheral portion of the end closures 23 engage the walls 5 in the manner of the tubes 19.

The conjoined cylinders 14 and 16 are inflated through a suitable inflation tube 25, one tube being sufficient as the two cylinders are in communication through the perforations 18. The inflation tube is connected to a suitable source of pressurized air. The pressure required is quite low, in the nature of approximately one pound per square inch above atmospheric pressure. The downward force exerted by the minor cylinder on the major cylinder may be varied by changing the inflation pressure; that is, the minor cylinder as it distorts acts as a downward loading spring forcing the major cylinder against the water, yet permitting ready compliance with the change in water level.

A conventional sealing means may be provided between the forward margin of the deck, the water below and the confronting sides 5 of the hulls so that a plenum 26 is formed under the deck. The plenum is supplied with air at relatively low pressure, but in high volume, from a conventional blower or the like, more fully disclosed in the aforementioned copending application. The plenum pressure is less than the inflation pressure of the cylinders 14 and 16.

In place of a conventional seal at the forward end of the deck, the seal structure shown in FIGS. 1 and 2 may be employed; whereas in the structure shown in FIGS. 1 and 2, the main or buoyant cylinder 16 trails behind the flexure cylinder 14; if the seal structure is adapted for use at the forward end of the plenum, the buoyant cylinder 16 projects forwardly and downwardly from the flexure cylinder 14. Inasmuch as the movement of water would tend to drive the buoyant cylinder 16 under the deck, restraining cables 27 are attached to the buoyant cylinder 16 and to the bow portions 3 of the hulls 1.

Operation of the seal structure is as follows:

If both a forward and rearward seal structure of the type disclosed is employed, the seal structures close the ends of the plenum 26. The seal is not intended to be perfect; instead, it is intended that plenum air flow under the buoyant cylinders. The downward force exerted by each buoyant cylinder is dependent upon the inflation pressure which determines the force required to flex or distort the cylinder 14. Also, the downward force is dependent upon the angular adjustment of the hinge plate 6. Both the cylinders 14 and 16 are formed of fabric material impregnated with a suitable elastomer and therefore have minimum weight, and consequently have minimum inertia. The construction of the end seals 19 or 23 is also such as to minimize weight and therefore minimize the inertia of the seal structure as a whole. As a consequence, the buoyant cylinders shift readily with change in the height of the underlying water and respond readily to wave action as the waves pass from the bow to the stern of the hovercraft.

It is highly desirable that the frictional contact between the buoyant cylinders 16 and the underlying water be minimized. This is accomplished by providing stepped planing surfaces 28 in the region of contact between the buoyant cylinder and the water. While some advantage is gained if such stepped planing surfaces extend axially with respect to the buoyant cylinder, the effect of the planing surfaces may be greatly increased by arranging the planing surfaces in a helical pattern, as shown particularly in FIG. 5. Each planing surface increases gradually from its leading toward its trailing edge, terminating at its trailing edge in a shoulder 29. When the buoyant cylinder is moving forwardly over the water, the water cavitates along each shoulder 29, forming air passages 30. By reason of the helical pattern provided by the planing surfaces, each air passage communicates between the plenum and the region outside the buoyant cylinder so that controlled outward flow of plenum air is provided while maintaining contact between the buoyant cylinder and the underlying water. This is graphically illustrated in FIG. 5 in which the shaded areas 31 represent the areas of contact between the buoyant cylinder and the water. It will be noted that FIG. 5 illustrates the condition with respect to the rear buoyant cylinder; that is, the direction of air flow and water flow with respect to the buoyant cylinder is the same, both flowing from the plenum side of the buoyant cylinder to the outboard side thereof. If FIG. 5 represented the condition with respect to a forward buoyant cylinder, the relative flow of water would be in the same direction, but the relative flow of air would be in the opposite direction from that illustrated.

By reason of the helical arrangement of the planing surfaces 28, there is a slight lateral force imparted to the hovercraft. Tests have indicated, however, that this force is too low to require special correction. However, if the planing surfaces be arranged in herringbone fashion, these forces may be cancelled.

It will be observed that the end seals 19 or 23 bear only slightly against the confronting walls 5 so that the resulting friction is low. Also, with respect to the ends of the flexure cylinder 14, it is not essential that a full seal be maintained, for any leakage here is but a small fraction of the total leakage of plenum air.

Reference is now directed to FIG. 7 which illustrates diagrammatically the toroidal buoyant cell 32 of a softwall hovercraft. Except for its toroidal curvature, the buoyant cell 32 appears essentially the same as that shown in FIG. 5. That is, diagonal, angular, planing surfaces 28 with helical shoulders 29 provide the air passages 30, all as illustrated in FIG. 5, except that the angle is increased and may be fixed with respect to the direction of travel, as illustrated, or may be essentially constant with respect to the local axis of the inflated cell 32. Also, fore and aft as well as at mid points at the sides of the cell, the planing surfaces form herring bone patterns. While at these areas the effectiveness of the planing surfaces are reduced, the areas involved constitute only a small percent of the total area.

The provision of the angularly extending planing surfaces under toroidal buoyant cells tends to alleviate a dangerous instability called "plough-in" observed in peripherally skirted hovercraft. That is, such hovercraft have on occasions experienced a dangerous loss of control initiated by a pitch down transient force causing the toroidal cell to make a high resistance contact. Just what occurs is not fully understood. One theory is that when complete water contact between the cell and the water occurs, the surface of the cell is flattened increasing the contact area of wetted skin friction. However, this does not seem to account for the observed drag. Another theory considers the effect of pressure drop in the water moving rapidly under the cell wall so that the wall is sucked into the water. Inasmuch as the wall is highly flexible, it may ripple or "flag" further increasing the drag load. Furthermore, the water flow, once attached to the surface of the cell, tends to cling and up the trailing or downstream surface of the cell adding to the force pulling the cell into the water.

In any case, the resulting sudden drag pulse decelerates the hovercraft while forming a couple with the inertial forward thrust of the center of gravity (plus the thrust of the air propeller if such is used) to amplify the pitch down further increasing the drag pulse sometimes to a sudden stop. Should this be combined with a sudden turn, the hovercraft may capsize.

The presence of the stepped planing surfaces 28 and shoulders 29 forming the passageways 30 reduces the possibility of high resistance water contact, thus avoiding the subsequent chain of events.

The rigid sidewall hovercraft illustrated in FIGS. 1 through 6 may be propelled by conventional means such as by an air propeller, by permitting increased rearward flow of plenum air or by motor driven water propellers at the sterns of the two hulls 1.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A seal structure forming a barrier between a plenum formed under a hovercraft and the region surrounding the hovercraft, wherein air above ambient pressure is delivered into the upper side of the plenum for controlled escape to the exterior of the hovercraft, said seal structure comprising:
   a. a sealed flexible seal member containing air at a pressure above the pressure in the plenum adapted, at least intermittently, to contact the underlying water surface for controlled escape of air from the plenum;
   b. a series of planing steps formed on the underside of said seal member and extending in angular relation to the flow of water under the seal member;
   c. said planing steps forming imperforate cavitation shoulders along their trailing edges, which, with respect to the direction of water flow, overlap whereby air flowing from the plenum through the regions of cavitation is in angular relation to the direction of water flow.

2. A seal structure, as defined in claim 1, for hovercraft having a pair of confronting rigid sidewalls and a connecting deck, wherein:
   a. at least one seal member extends between said sidewalls at an end of said deck;
   b. means flexibly connects said seal member to said deck and forms a seal therewith;
   c. and end seals are provided between said seal member and said confronting sidewalls.

3. A plenum air flow control means for marine hovercraft having confronting rigid sidewalls joined by a deck, the lower extremities of said sidewalls penetrating into an underlying water surface and said deck disposed above the water surface and forming with said sidewalls a plenum, said control means comprising:
   a. a closure structure extending between said sidewalls at an end of said deck and resting on the underlying water surface;
   b. said closure structure including a pair of longitudinally conjoined inflatable cylinders, the first cylinder being joined to said deck and distortable to produce an elastic download on said second cylinder against an underlying water surface;
   c. and means at each end of said closure structure slidably and sealingly engaging a confronting sidewall.

4. A seal structure, as defined in claim 3, wherein:
   a. a rigid hinge plate extends along the margin of said deck and is joined to said first cylinder;
   b. and means are provided to adjust the angular position of said hinge plate to vary downward force applied to said second cylinder.

5. A seal structure, as defined in claim 3, wherein:
   a. said closure structure includes a series of planing steps at its underside disposed in angular relation to the normal relative movement of the hovercraft over the water surface and tending to cause the water surface to cavitate along the trailing edge of each step thereby to cause water separation from said planing steps forming air channels across the underside of said closure structure.

6. A seal structure, as defined in claim 3, wherein:
   a. said closure structure is disposed in trailing relation to said deck adjacent the stern of said hovercraft.

7. A seal structure, as defined in claim 3, wherein:
   a. said closure structure is disposed forwardly of said deck adjacent the bow of said hovercraft;
   b. and tension elements are connected to said closure structure and said hovercraft to limit downward displacement of said closure structure.

8. A seal structure, as defined in claim 3, wherein:
   a. each end seal means includes an inflatable toroidal tube bonded to an end of at least said second cylinder for sealing and sliding engagement with a confronting sidewall;
   b. seal discs closing said tubes to seal the ends of said second cylinder whereby said tubes are forced against said confronting sidewall by pressure within said second cylinder;
   c. and a tension member joining said discs to limit relative outward movement in response to pressure in said second cylinder thereby to limit the force applied to said sidewalls by said tubes.

9. A seal structure, as defined in claim 3, wherein:
   a. a flexible end member closes and seals each end of at least said second cylinder and is exposed to the pressure internally thereof for sealing and sliding engagement with the confronting sidewall;
   b. and a tension member limits relative outward movement of said end members thereby to limit the force applied to said sidewalls by said end members.